June 22, 1948. S. E. JOHNSTON 2,443,861
SALMON EGG DISPENSER
Filed Feb. 28, 1946
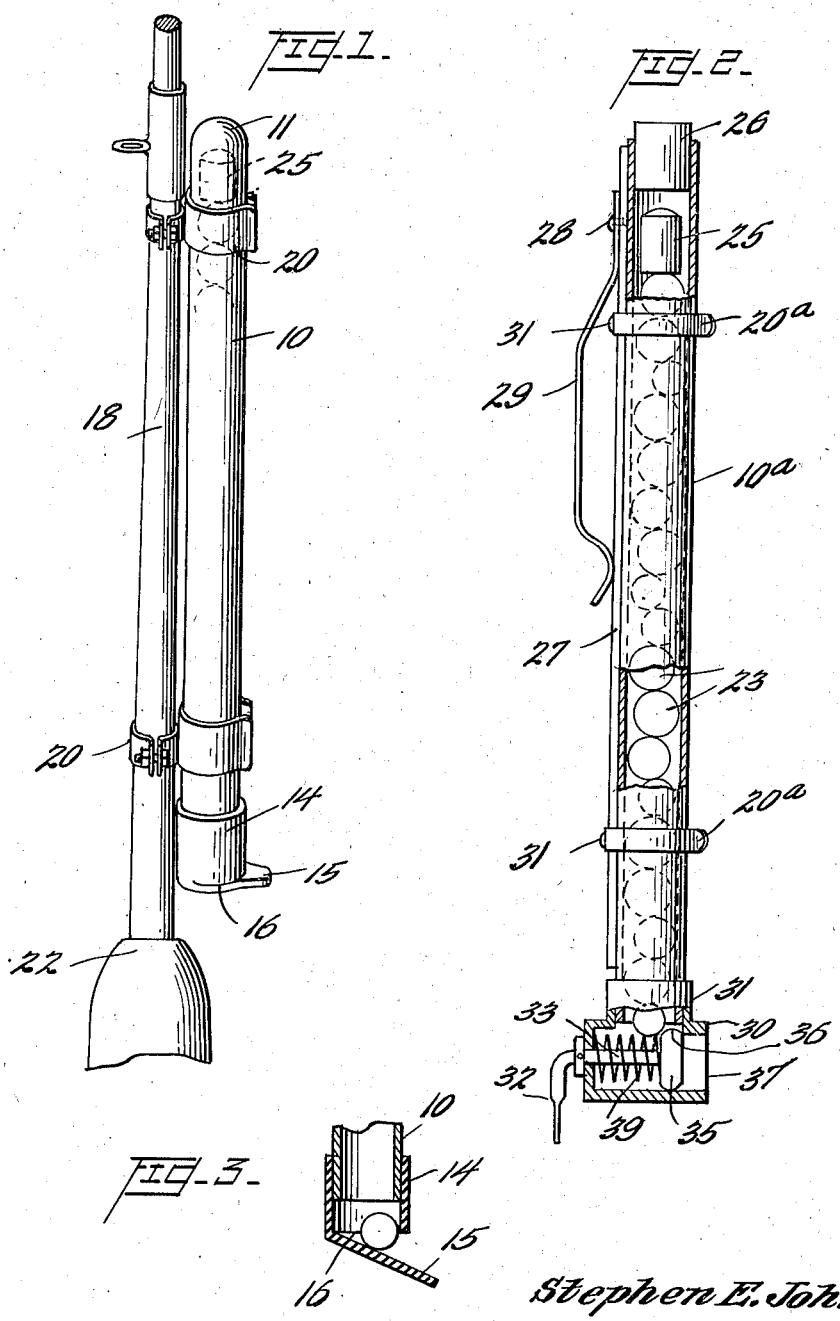

Patented June 22, 1948

2,443,861

UNITED STATES PATENT OFFICE 2,443,861

SALMON EGG DISPENSER

Stephen E. Johnston, Azusa, Calif.

Application February 28, 1946, Serial No. 650,996

2 Claims. (Cl. 312—49)

This invention relates to fishing and has for its principal object the provision of a dispenser for holding a couple of dozen salmon eggs to have them fresh and clean at all times and yet convenient for instant and easy access one at a time for placing on a hook. By providing the fisherman with a dispenser of this kind, the spilling of the fish eggs is avoided. Damage to the eggs is common when it is necessary to open and close a salmon egg jar, and the saving of time and the easy and convenient manipulation of the simple dispenser increase the pleasure of fishing.

While there are many styles and types of bait holders for holding live bait in convenient position for use by a fisherman, there are none which are available for holding articles like salmon eggs so that they can be had when required for baiting the hook.

A fisherman equipped with the dispenser of this invention not only can obtain a single salmon egg whenever he requires it but can be sure he is not subjecting the other eggs to any injury or mishandling for the dispenser preserves the entire supply clean, fresh and visible. When through fishing for the day the supply can quickly be removed from the dispenser and it is equally convenient and easy to fill the container when starting out on the fishing expedition.

In the drawings:

Figure 1 shows my device applied to a fishing rod.

Figure 2 shows the device secured to a holder for ready attachment to any carrying means.

Figure 3 shows the gate releasing a single salmon egg.

In the form shown in Figure 1, the tube 10 is preferably of Lucite but might be of glass or even a non-transparent body, such as metal. The top of the tube 10 is closed by a dome such as 11 and the lower end of the tube 10 is closed by a gate support 14 which is of neoprene, soft rubber or the like and this gate support fits the tube snugly but it can be readily removed.

At the bottom of the gate support there is an extended handle or gate 15 normally laying tight against the bottom edge 16 of the gate support but this integral handle may readily be pressed downward as in Figure 3, so as to uncover an area approximately that of the tube 10 itself.

I find the most convenient size of the dispenser to be materially less than an inch in outside diameter and find an inside diameter of about one-half an inch the most convenient of all sizes as it will keep the eggs from passing one another in the tube should they be reasonably small.

In Figure 1, 18 is the fishing rod carrying the two oppositely directed arms of a spring clip 20 to conveniently hold the transparent tube 10 in a position preferably just above the fishing rod handle 22.

The salmon eggs are denoted by the numeral 23 and I find that normally these are a bit too light to dispense readily when the lower end of the gate is pressed downwardly and for this reason I find it convenient to have a follower 25 at the top of the dispensing tube and resting lightly on the salmon eggs so that the lower egg drops into the fisherman's hand as he presses down on the tip of the handle 15 with his thumb.

In Figure 2 the Lucite or glass tube 10a is a straight cylindrical section with both of its ends normal to the axis of the tube. The top of this tube is then closed with a plastic plug 26 which has the same effect as the slightly more costly dome-like end 11 which is common in test tubes, for example, and is preferred both for looks and for cleanliness. In this modified form of dispenser, a strip of plastic, wood or fibre 27 has mounted on it, as for example by the rivet 28 or other fastener, a handle or spring clip 29 which can be held in the hand, clipped over the belt of the fisherman, or secured to a bait box, or other object. In this modified form spring clips 20a are secured directly to the support, as by the fastener 31, although in either case the clips may be fast to the tube and resiliently clasp the rod 18 or strip 27.

In Figure 2 a somewhat more elaborate gate device is illustrated. Here the body 30 of the gate support is roughly a tee having an upstanding neck 31 which snugly embraces the lower open end of the dispensing tube 10 or 10a. Instead of the dispensing handle 15 being integral with the body of the gate support as in Figure 1, the handle 32 is a portion of the shaft 33 having a plunger 35 at the end thereof to discharge the salmon eggs one at a time and preferably being curved at its forward margin as at 36 to prevent possible mashing of the egg just above the one being dispensed. Here the discharge is sideways through the opening 37. As to materials, it is my preference to have the gate support 30 of transparent material such as a clear plastic but to have of metal the plunger handle 32 and the spring 39 which urges the plunger 35 to closed position. The gate support 14 is frictionally held to the tube for ready removal but the gate support 30 may, if desired, be more permanently secured to the tube 10a as this type of tube may be filled from the top.

In filling the tube 10 the flexible gate support is pulled downwardly which readily frees it from the tube. The follower is first placed in the tube, which is held upside down, then the eggs are inserted and finally the gate support is slipped over the free end of the tube as a rubber cap. The filled tube is now righted so that the gate is at the bottom and is slipped into the two spaced clips on the fishing rod and the device is ready for use. The fisherman merely has to depress lightly the handle 15 to permit a single egg to pass from the container to his waiting hand and when released the handle or gate closure springs back to its original position to close the dispenser.

What I claim is:

1. In combination, a support, a tubular container for salmon eggs parallel to the support and having a closed end, means for detachably securing the container to the support very roughly vertical, with the closed end up, a follower within the container to rest upon the salmon eggs when the container is filled, a readily removable gate support frictionally fitting the lower end of the tubular container, and a flexible flap integral with the gate support forming a gate for releasing the salmon eggs one at a time.

2. The device of claim 1 in which the gate support is of elastic material to embrace the tube and the integral flap extends beyond the margin of the tube for engagement by the thumb of the user.

STEPHEN E. JOHNSTON.

REFERENCES CITED

The following references are of record in the file of this patent:

UNITED STATES PATENTS

| Number | Name | Date |
|---|---|---|
| 1,726,924 | Ryan | Sept. 3, 1929 |
| 1,778,952 | McCullough | Oct. 21, 1930 |
| 2,068,908 | Conti | Jan. 26, 1937 |

FOREIGN PATENTS

| Number | Country | Date |
|---|---|---|
| 296,835 | England | Sept. 13, 1928 |